United States Patent [19]

Cusdin

[11] Patent Number: 4,780,722

[45] Date of Patent: Oct. 25, 1988

[54] RADIO DIRECTION-FINDING

[75] Inventor: Anthony R. Cusdin, Horley, England

[73] Assignee: U.S. Philips Corporation, New York, N.Y.

[21] Appl. No.: 38,808

[22] Filed: Apr. 15, 1987

[30] Foreign Application Priority Data

Apr. 18, 1986 [GB] United Kingdom ............... 8609553

[51] Int. Cl.$^4$ .............................................. G01S 3/04
[52] U.S. Cl. .................................. 342/437; 342/446; 342/432
[58] Field of Search ............... 342/417, 432, 437, 446

[56] References Cited

U.S. PATENT DOCUMENTS

| | | | |
|---|---|---|---|
| 3,113,315 | 12/1963 | Preikschat | 342/417 |
| 3,540,053 | 11/1970 | Sparangna et al. | 342/446 |
| 3,803,613 | 4/1974 | Wright | 342/427 |
| 3,824,595 | 7/1974 | Hall | 342/432 |
| 3,886,556 | 5/1975 | Lowman | 342/437 |
| 4,057,803 | 11/1977 | Coleman | 342/446 |
| 4,449,192 | 5/1984 | Watanabe et al. | 342/446 |
| 4,638,319 | 1/1987 | Chua | 342/417 |

FOREIGN PATENT DOCUMENTS 0105476  5/1986  Japan ................... 342/446

Primary Examiner—Theodore M. Blum
Assistant Examiner—Mack Hellner
Attorney, Agent, or Firm—Robert J. Kraus

[57] ABSTRACT

A radio direction-finding system comprises at least two adjacent, coplanar rectilinear antenna arrays ($ARR_1$, $ARR_2$) which face in different directions; phase measurements are performed on pairs of antennae of different spacings ($ANT_C/ANT_1$-$ANT_N$) in each array in order to derive the direction of incidence in the plane of the arrays and/or the direction of incidence with respect to said plane, e.g. bearing ($\theta$) and elevation ($\beta$) respectively. To reduce the number of channels required for resolving ambiguity in the phase measurement on the widest-spaced antenna pair ($ANT_C/ANT_N$) in each array, ambiguity is resolved as far as possible with more closely spaced pairs in each array and finally resolved on the two arrays jointly by amplitude comparison of signals received by the two arrays, even though the accuracy of the amplitude comparison may be insufficient to resolve ambiguity in the arrays separately. The invention is particularly applicable to a broadband system for radio sources which may be at substantial angles of elevation, e.g. up to 50 degrees.

10 Claims, 4 Drawing Sheets

RADIO DIRECTION-FINDING

BACKGROUND OF THE INVENTION

The invention relates to a method of radio direction-finding. The invention further relates to a radio direction-finding system.

A radio direction-finding system commonly used at microwave frequencies, generally to provide omnidirectional coverage in azimuth, comprises a plurality of identical antennae disposed about a common central point, the main beam axes of the antennae being disposed at regular angular intervals; for omnidirectional azimuth coverage, there are typically six antennae with their main beam axes disposed in the azimuth plane. To determine the direction from which radiation is incident on the system, the amplitudes of the two strongest signals respectively received at two adjacent antennae are compared; the direction lies between the main beam axes of the two antennae and the ratio of the amplitudes is a function of the angle between the direction of incidence and either of the axes. Such a system may be broadband if each of the antennae has approximately constant beamwidth over the operating band. An amplitude-comparison system has the advantages that it provides an indication of the direction of incidence in the plane of the antennae main beam axes (typically the azimuth plane) virtually independently of whether the source lies in that plane (i.e. if the source does not lie in the plane, the direction indicated is substantially the projection of the actual direction into that plane), and that the indication is generally unambiguous, but has the disadvantage that the accuracy is not very great, being for example ±5°.

Greater accuracy in radio direction-finding can be obtained by performing phase measurements on a rectilinear antenna array (typically forming an interferometer) including a pair of antennae with a sufficiently large spacing in terms of the operating wavelength to provide an unambiguous indication of direction. However, the direction of incidence obtainable from the plane measurements on such an array is the direction in the plane of the array and the source, so that if the source does not lie in a desired plane including the array (typically the azimuth plane), the direction indicated is not the direction as projected into the desired plane. It is known that by using two coplanar such arrays which face in different respective directions, it is possible to calculate the direction of incidence as projected into the plane of the arrays and/or the direction of incidence with respect to said plane. However, using a plurality of antenna arrays in each of which ambiguity can be fully resolved necessitates a large number of channels (antennae plus processing), making the system expensive.

SUMMARY OF THE INVENTION

According to a first aspect of the invention, a method of radio direction-finding uses a system comprising at least two adjacent, coplanar, rectilinear antenna arrays which face in different respective directions and which are adapted to receive radiation from a distant source, the method comprising: with each of said two arrays, performing phase measurements on a plurality of pairs of antennae of different spacings, from the phase measurements on each array, resolving ambiguity as far as possible in the phase measurement on the widest-spaced pair of antennae of that array by reference to the phase measurement(s) on one or more closely spaced pairs of antennae of the same array whereby to derive first and second quantities respectively representative of the possible values of the angle, in the plane by the source and a first and the second of said two arrays, at which the radiation is incident on the respective array, comparing the amplitudes of the radiation respectively received by said two arrays at one or more antennae of each and deriving therefrom a third quantity approximately but unambiguously representative of the direction of incidence of the radiation projected into the plane of the arrays, and deriving from the first and second quantities of representation of the angle $\theta$ between the direction of incidence of the radiation projected into the plane of the arrays and a reference direction in the plane of the arrays that is consistent with the third quantity.

According to a second aspect of the invention, a method of radio direction-finding uses a system comprising at least two adjacent, coplanar, rectilinear antenna arrays which face in different respective directions and which are adapted to receive radiation from a distant source, the method comprising: with each of said two arrays, performing phase measurements on a plurality of pairs of antennae of different spacings, from the phase measurements on each array, resolving ambiguity as far as possible in the phase measurement on the widest-spaced pair of antennae of that array by reference to the phase measurement(s) on one or more more closely spaced pairs of antennae of the same array whereby to derive first and second quantities respectively representative of the possible values of the angle, in the plane of the source and a first and the second of said two arrays, at which the radiation is incident on the respective array, comparing the amplitudes of the radiation respectively received by said two arrays at one or more antennae of each and deriving therefrom a third quantity approximately but unambiguously representative of the direction of incidence of the radiation projected into the plane of the arrays, and deriving from the first and second quantities the frequency of the radiation a representation of the angle $\beta$ between the direction of incidence and the plane of the arrays that is consistent with the third quantity.

According to a third aspect of the invention, a radio direction-finding system comprises at least two adjacent, coplanar, rectilinear antenna arrays which face in different respective directions and which are adapted to receive radiation from a distant source, means for performing on each of said two arrays phase measurements on a plurality of pairs of antennae of different spacings, means for resolving ambiguity as far as possible in the phase measurement on the widest-spaced pair of antennae of each array by reference to the phase measurement(s) on one or more more closely spaced pairs of antennae of the same array whereby to derive first and second quantities respectively representative of the possible values of the angle, in the plane of the source and a first and the second of said two arrays, at which the radiation is incident on the respective array, means for comparing the amplitudes of the radiation respectively received by said two arrays at one or more antennae of each and for deriving therefrom a third quantity approximately but unambiguously representative of the direction of incidence of the radiation projected into the plane of the arrays, and means for deriving from the first and second quantities a representation of the angle $\theta$ between the direction of incidence of the radiation projected into the plane of the arrays and a reference direction in the plane of the arrays that is consistent with the third quantity.

According to a fourth aspect of the invention, a radio direction-finding system comprises at least two adjacent, coplanar, rectilinear antenna arrays which face in different respective directions and which are adapted to receive radiation from a distant source, means for performing on each of said two arrays phase measurements on a plurality of pairs of antennae of different spacings, means for resolving ambiguity as far as possible in the phase measurement on the widest-spaced pair of antennae of each array by reference to the phase measurement(s) on one or more more closely spaced pairs of antennae of the same array whereby to derive first and second quantities respectively representative of the possible values of the angle, in the plane of the source and a first and the second of said two arrays, at which the radiation is incident on the respective array, means for comparing the amplitudes of the radiation respectively received by said two arrays at one or more antennae of each and for deriving therefrom a third quantity approximately but unambiguously representative of the direction of incidence of the radiation projected into the plane of the arrays, and means for deriving from the first and second quantities and the frequency of the radiation a representation of the angle $\beta$ between the direction of incidence and the plane of the arrays that is consistent with the third quantity.

Where the system comprises 3 or more said arrays, a method embodying the invention suitably further comprises comparing the amplitudes of the radiation received by each of the arrays at one or more antennas thereof and selecting as the two arrays from phase measurements on which arrays said two quantities are to be derived a first of the arrays at which the amplitude is greater than or equal to the amplitudes at the remaining arrays and, from the two arrays at the smallest angles to the first array, a second array at which the amplitude is greater than or equal to the amplitude at the other of those two arrays. A system comprising 3 or more said arrays and embodying the invention may accordingly comprise means for so comparing amplitudes and means for so selecting first and second arrays. A rectilinear antenna array generally comprises a plurality of directional antennae whose main beam axes are coplanar and which face in the same general direction. The direction in which the array faces may be taken to be along the broadside to the array, in the sense which is in that same general direction. In considering the angles between adjacent arrays, account must of course be taken of the directions in which the arrays are facing. Thus for example, arrays which are parallel but which face in opposite directions are to be taken as being at an angle of 180° to each other.

The use of an approximate but unambiguous representation, obtained by amplitude comparison, of the direction of incidence projected into the plane of the arrays enables ambiguity in the representations of direction obtained by phase measurements on the antenna arrays to be resolved, thereby enabling the use of fewer channels in the antenna arrays.

In a system embodying the invention and comprising 3 or more arrays, the arrays may be disposed successively end to end. For such a system to provide omnidirectional coverage, 4 or more arrays may be disposed substantially in a closed loop.

A system embodying the invention may comprise means for detecting whether the angle between the direction of incidence of the radiation and the plane of the arrays exceeds a predetermined value and for inhibiting the calculation of the further quantity or quantites if it does. Said predetermined value may be varied in dependence on the frequency of the radiation.

BRIEF DESCRIPTION OF THE DRAWING

An embodiment of the invention will now be described, by way of example, with reference to the diagrammatic drawing figures in which.

DESCRIPTION OF THE PREFERRED EMBODIMENTS

Figure 1:
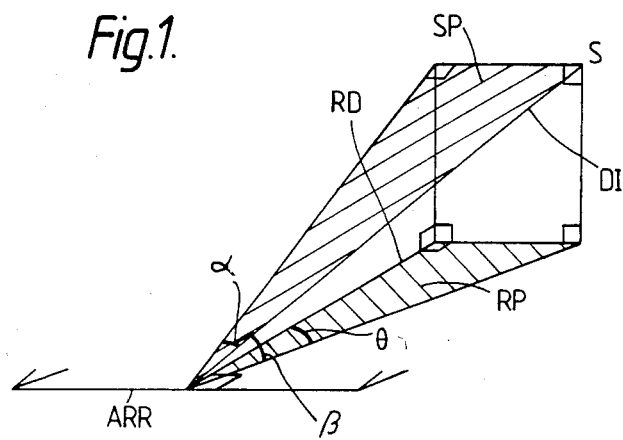
FIG. 1 illustrates the relative disposition of a source of radiation and an antenna array.

FIG. 1 illustrates the relative disposition of a rectilinear antenna array ARR, forming part of a direction-finding system, and a distant source S of electromagnetic radiation having a frequency in the operating frequency range of the system. In this Figure and succeeding Figures (except FIG. 3), for simplicity only the two antennae respectively at each end of the array are schematically depicted. Information it is desired to obtain is the angle $\theta$ between a reference direction RD in a reference plane RP including the array ARR, the reference direction being in this case normal to the array ARR, and the direction of incidence DI of the radiation as projected into the reference plane RP. Thus where the reference plane is the horizontal (azimuth) plane, the angle $\theta$ may be the bearing of the source. However, the information which can be obtained from phase measurements on the antenna array is a representation of the angle $\alpha$, in the plane SP of the source S and the array ARR, between the reference direction RD projected into that plane (SP) and the direction of incidence DI. The angle $\alpha$ and $\theta$ are related by the equation $$\sin \alpha = \sin \theta \cos \beta \qquad (i)$$

where $\beta$ is the angle between the direction of incidence DI and the reference plane RP. If the reference plane is horizontal, the angle $\beta$ is the elevation of the source.

As is known, the angle $\theta$ and/or the angle $\beta$ may be ascertained from phase measurements on two adjacent, coplanar antenna arrays facing in different directions. This will be illustrated by reference to the arrangement of FIG. 2 which shows two adjacent, coplanar arrays, $ARR_1$ and $ARR_2$ respectively, that are disposed at an angle of $\theta_R$ to each other. The arrays may be used to ascertain the direction of incidence of radiation from sources lying in front of both arrays, suitably in the sector between the broadside to each array; for example, the angle $\theta$ with reference to the broadside to the first array $ARR_1$ may be determined.

Figure 3:
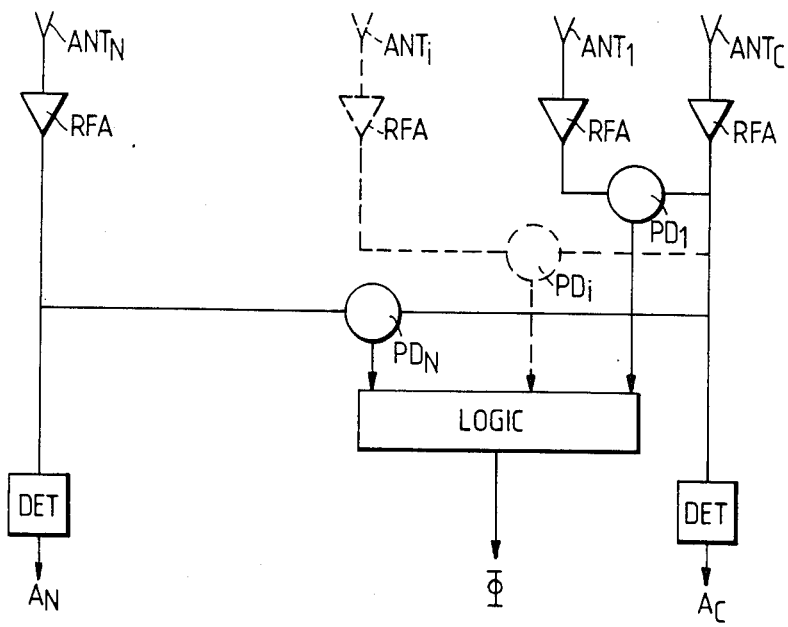
FIG. 3 shows in more detail an antenna array and associated processing equipment.

FIG. 3 shows in more detail an antenna array and associated processing equipment. The array comprises a plurality of identical directional antennae ANT which are disposed along a straight line and which each face in the same direction normal to that line. One of the antennae, suitably at one end of the array, serves as a common antenna $ANT_C$, and the remaining antennae $ANT_1 \ldots ANT_i \ldots ANT_N$ are disposed at progressively greater spacings from it: successive spacings may be in the ratio of 2:1. The signals from the antennae are amplified in respective RF amplifiers RFA, and the phase differences between the signal derived from the common antenna and the signals derived from each of the other antennae are measured by respective phase discriminators $PD_1 \ldots PD_i \ldots PD_N$. The phase measurements may be made directly at RF or after conversion to an IF. The phase measurement on the antenna pair with the widest spacing, $ANT_N/ANT_C$, gives the most accurate represenattion of the angle of incidence, $\alpha$, but the representation is ambiguous. The ambiguity is resolved as far as possible by reference to the phase measurements on the antenna pairs with progressively smaller spacing. This is performed in logic circuitry LOGIC to which the outputs of the phase discriminators are fed. Conventionally, the spacing of the closest-spaced pair of antennae is such as to enable the ambiguity to be fully resolved, and in that case the logic circutry produces a representation of the unambiguous phase angle $\phi$ where $$\phi = (2\pi d/\lambda) \sin \alpha \qquad \text{(ii)}$$

where d is the spacing of the closest-spaced pair of antennae and $\lambda$ is the wavelength of the radiation, the accuracy of $\phi$ being based on the measurement on the widest-spaced pair of antennae.

The detectors DET shown in FIG. 3 will be referred to later.

Figure 2:
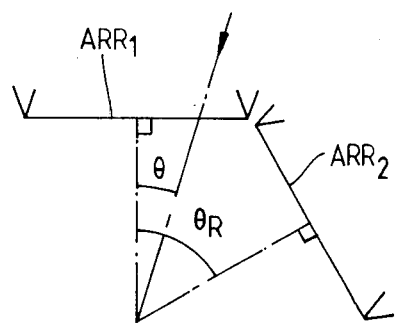
FIG. 2 depicts a pair of coplanar antenna arrays.

To obtain the angle $\theta$ between the direction of incidence of the radiation projected into the plane of the arrays of FIG. 2 and the normal to the first array, the unambiguous phase differences $\phi_1$ and $\phi_2$ related to the closest-spaced pair of the first and second arrays respectively are derived. Now we may write in relation to the first and second arrays respectively $$\sin \alpha_1 = \sin \theta \cos \beta \qquad \text{(iii)}$$

$$\sin \alpha_2 = \sin (\theta - \theta_R) \cos \beta \qquad \text{(iv)}$$

from which one obtains $$\cot \theta = \cot \theta_R - (1/\sin \theta_R)(\sin \alpha_2/\sin \alpha_1) \qquad \text{(v)}$$

$$= \cot \theta_R - (1/\sin \theta_R)(\phi_2/\phi_1) \qquad \text{(vi)}$$

It should be noted that determination of $\theta$ does not require knowledge of the wavelength of the radiation, whereas such knowledge would be required if phase measurements were performed on only a single array. This may be of particular benefit for a broadband direction-finding system. An expression for $\beta$ may similarly be derived from equations (i), (iii) and (iv), or having derived $\theta$, $\beta$ may more simply be expressed from equations (i) and (iii) as $$\cos \beta = (\lambda/2\pi d)(\phi_1/\sin \theta). \qquad \text{(vii)}$$

Determination of $\beta$ therefore requires knowledge of the wavelength of the radiation. In a broadband system, this may for example be obtained by specifically measuring the frequency f of the radiation with an Instantaneous Frequency Measurement (IFM) device, from which $$\lambda = c/f \qquad \text{(viii)}$$

where c is the speed of light; as an alternative, in a superhet system, an IF filter with a fixed narrow passband may be employed and the local oscillator frequency appropriately adjusted for the frequency of the incident radiation, the local oscillator frequency being known from prior calibration or by measurement with an IFM device and the frequency of the incident radiation being calculated accordingly.

Figure 4:
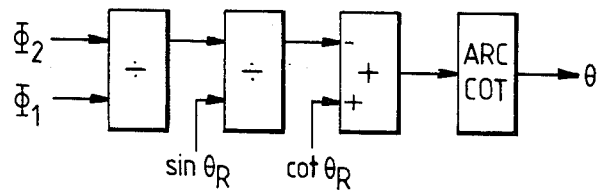
FIG. 4 illustrates schematically processing to calculate a directional angle $\theta$.
Figure 5:
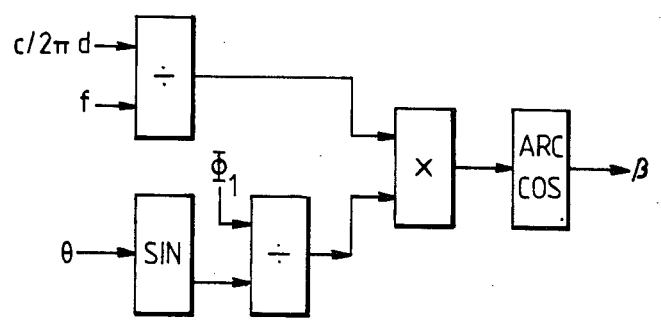
FIG. 5 illustrates schematically processing to calculate a directional angle $\beta$.

FIGS. 4 and 5 illustrate schematically processing to obtain the values of $\theta$ and $\beta$ in accordance with equation (vi) and with equations (vii) and (viii) respectively.

Figure 6:
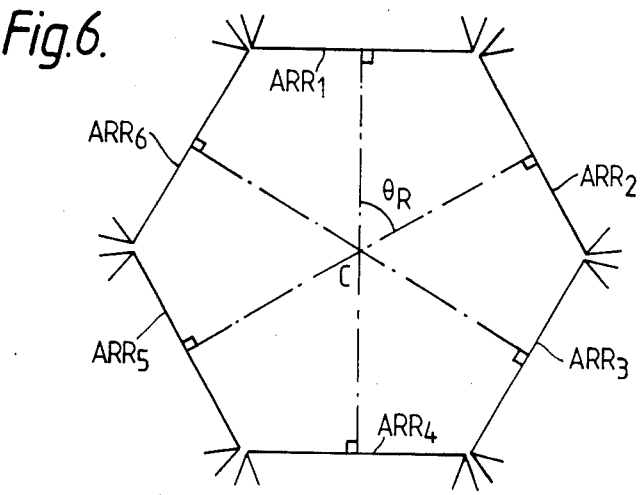
FIG. 6 depicts six coplanar antenna arrays forming a closed loop.

To provide omnidirectional coverage in azimuth, the arrangement of antenna arrays depicted schematically in FIG. 6 may be used. This comprises six rectilinear antenna arrays, $ARR_1$-$ARR_6$ respectively, disposed successively end-to-end, in a horizontal plane, about a common central point C at regular angular intervals $\theta_R$ so as to form a closed loop.

To limit the cost of the a direction-finding system using two or more antenna arrays, it is desirable to reduce the total number of channels in the system from that which would be required fully to resolve ambiguity in each array; furthermore, there may be practical difficulty in situating antennae sufficiently close together for ambiguity to be fully resolved, especially at higher frequencies. By analogy with equation (ii), we may write:

$$\sin \alpha_1 = (\phi_{M1} + 2m\pi) \cdot \lambda/2\pi d \qquad \text{(ix)}$$

where $\phi_{M1}$ is derived from the phase measurement on the widest-spaced pair of antennae in the first antenna array and related to the closest-spaced pair thereof, and m is any integer such that $-1 \leq \sin \alpha_1 \leq 1$. A similar equation can be written for $\alpha_2$. As an example, for a frequency of 18 GHz($\lambda = 5/3$ cm) and d=5 cm, equation (ix) can be rewritten $$\sin \alpha_1 = (\phi_{M1}/6\pi) + m/3. \qquad \text{(x)}$$

Consequently there is a 6-fold ambiguity in $\phi_{M1}$: if we assume that the phase is measured in the range $\pm \pi$, then m may be any integer (including zero) such that either $-3 \leq m \leq 2$ or $-2 \leq m \leq 3$ (which of the two values $-3$ and $+3$ is possible depends on whether $\phi_{M1}$ is positive or negative respectively), and the boundaries between successive ranges of $\alpha$ corresponding to the different values of m occur at approximately $9\frac{5}{8}°$, $30°$ and $56\frac{1}{2}°$ and negative angles of the same magnitudes. This may be taken to be the worst case, i.e. the highest frequency of operation of the system.

Other means must then be found fully to resolve ambiguity. Amplitude comparison may be used to provide an approximate but unambiguous indication of the direction of incidence. However, this involves the difficulty that the unambiguous quantity derived from amplitude comparison approximately represents the angle $\theta$, whereas the quantity derived from phase measurements accurately but ambiguously represents the angle $\alpha$. Now the difference between and $\theta$ increases from zero as the angles $\theta$ and $\beta$ both increase from zero. For example, if the angle $\alpha$ is 30°, the angle $\theta$ may be as high as approximately 51° if the angle $\beta$ is 50°. Thus for example a value for $\theta$, obtained by amplitude comparison, of 53°±6° would not enable ambiguity in a phase measurement of zero on one antenna array to be fully resolved: $\theta$ could be, say, 50° with a large value of $\beta$ or, say, 57° with a very small value of $\beta$.

However, it has been recognised that the accurate but ambiguous phase measurements on the two adjacent antenna arrays must also be consistent with one another as well as with the approximate but unambiguous result of amplitude comparison. A study has shown that with practical parameter values, ambiguity can generally be resolved in the phase measurements on the two arrays taken together even though it could not be resolved in the phase measurements on the two arrays taken separately. This may require limitation of the range of values of the angle $\beta$ for which calculations are to be made. By way of example, inserting a value for $\phi_{M1}$ of 108° (3 $\pi$/5) in equation (x) gives $$\sin \alpha_1 = 0.1 + m/3 \qquad \text{(xi)}$$

Figure 7:
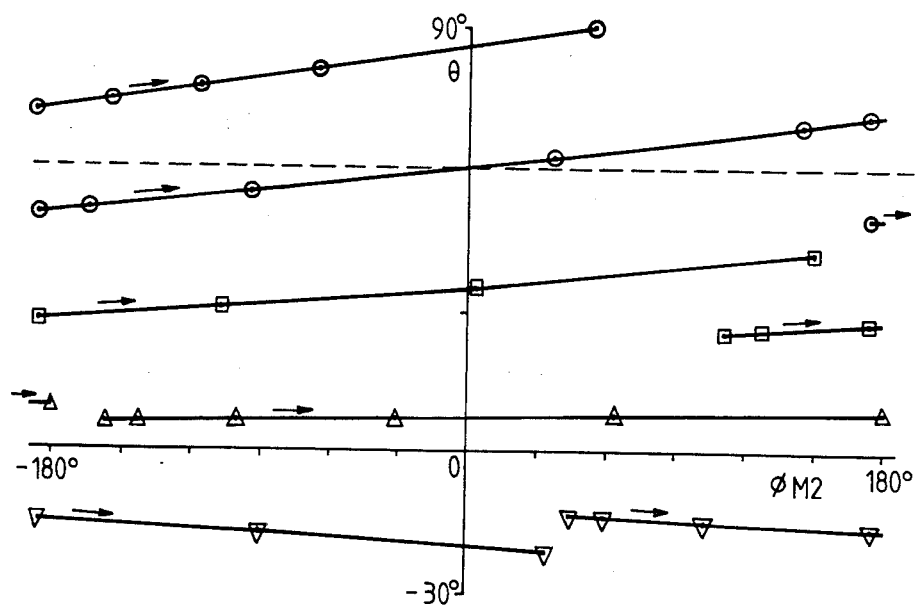
FIG. 7 is a graph of the angle $\theta$ against a measured phase.

FIG. 7 shows possible values of $\theta$ as a function of the measured phase $\phi_{M2}$ with respect to the closed-spaced pair of antennae in the second antenna array. With the angle $\theta_R = 60°$, coverage by this pair of arrays is basically required for $\theta$ in the range 0°–60°, with a small extension on each side of that range to allow for possible selection of the incorrect pair of arrays when the source of radiation is close to the broadside to the first array. FIG. 7 shows $\theta$ in the range of $-30°$ (the limit of coverage of the second array) to $+90°$ (the limit of coverage of the first array) although it should be borne in mind that, as just indicated, coverage is not normally required much outside the range of 0°–60°; the value 60° is indicated by a dashed line in FIG. 7. The angle $\beta$ has been restricted to the range 0°–50°, and m takes the values $-1$ (points in inverted triangles in FIG. 7; sin $\alpha_1 = -0.23$), 0 (upright triangles; sin $\alpha_1 = 0.1$), 1 (squares; sin $\alpha_1 = 0.43$) and 2 (circles; sin $\alpha_1 = 0.73$) for the allowed range of $\theta$. For each value of m except 2 (points in circles), points have been plotted for values of $\beta$ at intervals of 10° from 0°–50° inclusive; in the case of m=2, points have been plotted for values of $\beta$ of 0, 10, 20, 30, 35, 36, 37, 38, 39 and 39.94 degrees (at the last value of $\beta$, $\theta = 90°$). For each line on the graph, an arrow indicates the direction of increasing $\beta$. Points that occur at or just below a value for $\phi_{M2}$ of $+180°$ are repeated at or just below $-180°$. It can be seen that in most cases, possible values of $\theta$ are separated by approximately 20° and even in the worst case ($110° < \phi_{M2} < 150°$, m=1) possible values of $\theta$ are separated by approximately 15°. The ambiguity should therefore generally be resolvable by an amplitude comparison arrangement which has an accuracy of ±6°. If the elevation is limited to 40°, an accuracy in the amplitude comparison of about ±10° will suffice.

To implement the amplitude comparison, there are associated with each of the arrays means for measuring the amplitude of the radiation received at one or more antennae of the array. In the antenna array arrangement of FIG. 6, the amplitude is measured for the antenna at each end of each array. As depicted in FIG. 3, a respective diode detector DET measures the amplitude $A_C$ and $A_N$ respectively of the amplified signals from the end antennae $ANT_C$ and $ANT_N$ respectively.

Figure 8:
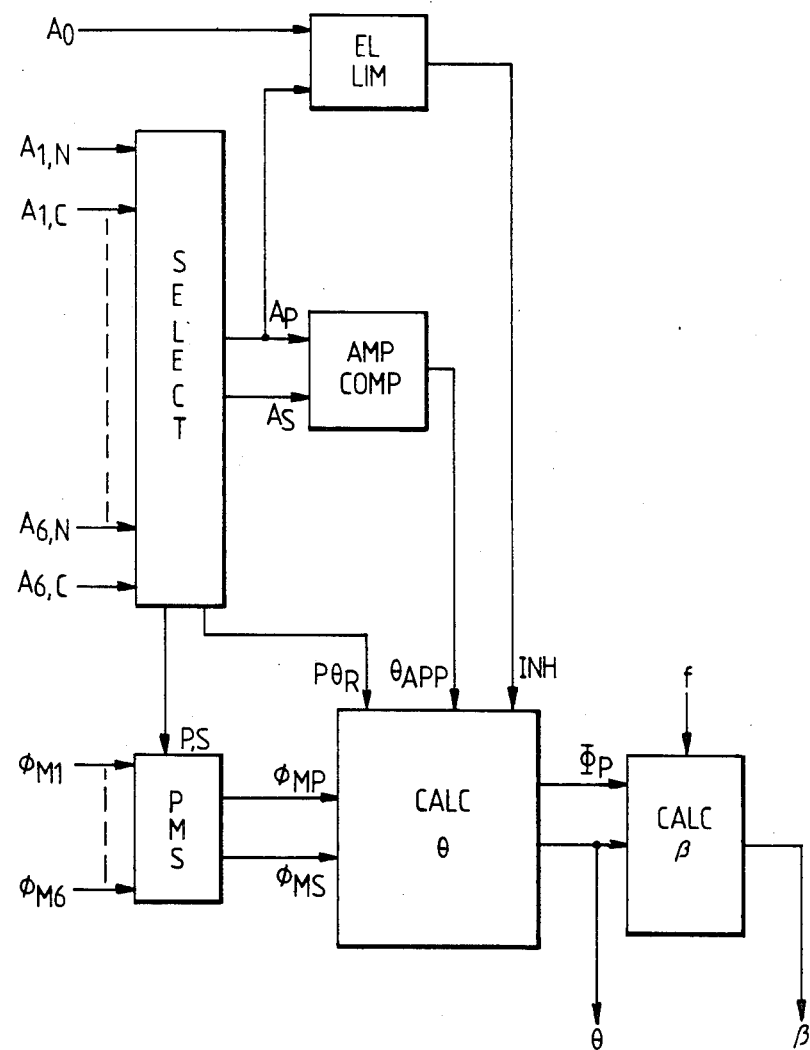
FIG. 8 illustrates schematically a processing arrangement to resolve ambiguity in phase measurements by using amplitude comparison and to calculate $\theta$ and $\beta$.

The derivation of the angles $\theta$ and $\beta$ from the phase and amplitude measurements is shown schematically in FIG. 8. The measured amplitudes from the end antennae of each of the six arrays $ARR_1$–$ARR_6$, $A_{1,N}$, $A_{1,C}$ ... $A_{6,N}$, $A_{6,C}$ respectively, are fed to a comparison and selection unit SELECT. This unit selects as a primary array an array at which the amplitude is greater than or equal to the amplitudes at the remaining arrays; (for this purpose, the measured amplitudes at the two ends of an array, $A_N$ and $A_C$, may be averaged, or the primary array may be selected as the array at one of whose antennae the largest amplitude is measured. The selection unit selects as a secondary array one of the two arrays that are adjacent the primary array, at which one array the amplitude is greater than or equal to the amplitude at the other of those two arrays. The numbers of the primary and secondary arrays, and quantities derived therefrom, are denoted in FIG. 8 by the letters P and S. The values of P and S are supplied to a phase measurement selection unit PMS which selects from the measured phases $\phi_{M1}$–$\phi_{M6}$ on the six arrays (in which phases the ambiguity has been resolved as far as possible) the phases $\phi_{MP}$ and $\phi_{MS}$ from the primary and secondary arrays respectively. The unit SELECT also supplies to an amplitude comparison unit AMP COMP the amplitudes $A_P$ and $A_S$ measured on the two adjacent antennae of the primary and secondary arrays (for example in the case of arrays $ARR_1$ and $ARR_2$ the amplitudes from $ANT_{1,C}$ and $ANT_{2,N}$, the antennae in each array being denoted as in FIG. 3): by using two relatively closely spaced antennae for amplitude comparison, errors due to differences in multipath propagation to the two antennae are in general reduced. From the ratio $A_P/A_S$, the amplitude comparison unit AMP COMP produces an approximate but unambiguous representation $\theta_{APP}$ of the angle $\theta_P$ between the direction of incidence of the radiation and the broadside to the primary array, and supplies this to a unit for calculating $\theta$, CALC $\theta$. This latter unit also receives from the unit PMS the accurate but ambiguous representations of the phase angles $\phi_{MP}$, $\phi_{MS}$ from the primary and secondary arrays. As explained above, the unit CALC $\theta$ calculates from $\phi_{MP}$ and $\phi_{MS}$ the possible accurate values of the angle $\theta_P$ and selects one which is consistent with the approximate value $\theta_{APP}$ from the amplitude comparison unit. The selected accurate value is added to a representation P$\theta_R$ of the angle between a reference direction and the broadside to the primary array that is supplied from the unit SELECT to produce an accurate representation of the angle $\theta$ between the direction of incidence of the radiation projected into the plane of the arrays and the reference direction.

As explained above, if it is to be possible to resolve ambiguity in the phase measurements, using amplitude comparison, with a fair degree of certainty, it may be necessary to limit the range of the angle $\beta$ in respect of which the calculations and ambiguity resolution are performed, in this case the maximum value of $\beta$. For this purpose, an elevation limit unit EL LIM supplies an inhibiting signal INH to the unit CALC $\theta$ if the elevation of the source (i.e. the angle $\beta$ for a system which determines $\theta$ in azimuth) lies above a certain limit. To ascertain this condition, the unit EL LIM may for example (as indicated in FIG. 8) compare the amplitude $A_P$ of the signal from the primary array antenna with the amplitude $A_O$ of the signal from an antenna having a different radiation response in elevation, for example an antenna having an omnidirectional response in azimuth and a maximum response for a value of $\beta$ substantially greater than zero. For a broadband direction-finding system, since the likelihood of the ambiguity resolution breaking down increases with frequency, the unit EL LIM may also be supplied (not shown) with the frequency of the radiation (the value being known as previously indicated) and may vary the limiting value of $\beta$ correspondingly. When the calculation of $\theta$ from $\phi_{MP}$ and $\phi_{MS}$ is inhibited, the unit CALC $\theta$ may use the value of $\theta_{APP}$ from the unit AMP COMP and the value of P$\theta_R$ to produce an approximate value of $\theta$.

As an alternative for limiting the range of $\beta$ in respect of which the calculations and ambiguity resolution are performed, the antennae of the arrays may have a sharp cut-off in their $\beta$-plane radiation patterns. However, this will result in the behaviour of the system for radiation incident from directions in the region of the cut-off being dependent on the magnitude of the radiation; it is likely to be most appropriate for a simple narrow-band system.

To derive a value for $\beta$, the unit CALC $\theta$ may supply a calculated value of $\theta$ and a value $o_P$ of the phase from the primary array, in which ambiguity has been fully resolved, to a unit CALC $\beta$ which also receives the frequency f and which calculates $\beta$ in accordance with the process described above with reference to FIG. 5.

I claim:

1. A method of radio-direction finding using a system comprising a plurality of adjacent, coplanar, rectilinear antenna arrays which face in different respective directions and which are adapted to receive radiation from a distant source, the method comprising:
   a. for each of first and second ones of the arrays:
      (1) determining a first phase difference between the radiation received at a widely-spaced pair of the antennae in the array and determining a second phase difference between the radiation received at a more-closely-spaced pair of the antennae in the array;
      (2) deriving from the first and second phase differences respective first and second quantities representative of possible values of an angle, in a plane containing the array and a source of the radiation, at which the radiation is incident on said array;
   b. comparing the amplitudes of the radiation received by corresponding ones of the antennae of the first and second arrays and deriving therefrom a third quantity approximately, but unambiguously, representative of the direction of incidence of the radiation projected into the plane of the arrays; and
   c. deriving from the first and second quantities a representation of an angle $\theta$ between the direction of incidence of the radiation projected into the plane of the arrays and a reference direction in the plane of the arrays, said single $\theta$ being consistent with the third quantity.

2. A method of radio-direction finding using a system comprising a plurality of adjacent, coplanar, rectilinear antenna arrays which face in different respective directions and which are adapted to receive radiation from a distant source, the method comprising:
   a. for each of first and second ones of the arrays:
      (1) determining a first phase difference between the radiation received at a widely-spaced pair of the antennae in the array and determining a second phase difference between the radiation received at a more-closely-spaced pair of the antennae in the array;
      (2) deriving from the first and second phase differences respective first and second quantities representative of possible values of an angle, in a plane containing the array and a source of the radiation, at which the radiation is incident on said array;
   b. comparing the amplitudes of the radiation received by corresponding ones of the antennae of the first and second arrays and deriving therefrom a third quantity approximately, but unambiguously, representative of the direction of incidence of the radiation projected into the plane of the arrays; and
   c. deriving from the first and second quantities and the radiation frequency a representation of an angle $\beta$ between the direction of incidence of the radiation and the plane of the arrays, said angle $\beta$ being consistent with the third quantity.

3. A method as in claim 1 or 2 where the amplitudes of the radiation received are compared for corresponding ones of the antennae of at least three of said arrays, where the first array is the array which receives the largest amplitude radiation, and where the second array is one of two arrays forming the smallest angles with the first array which receives radiation of amplitude larger than or equal to the radiation received by the other of the two arrays.

4. A radio-direction finding system comprising:
   a. a plurality of adjacent, coplanar, rectilinear antenna arrays which face in different respective directions and which are adapted to receive radiation from a distant source;
   b. means for determining, for each of first and second ones of the arrays, a first phase difference between the radiation received at a widely-spaced pair of the antennae in the array and a second phase difference between the radiation received at a more-closely-spaced pair of the antennae in the array;
   c. means for deriving from the first and second phase differences determined for each of the first and second arrays respective first and second quantities representative of possible values of an angle, in a plane containing the respective array and a source of the radiation, at which the radiation is incident on said array;
   d. means for comparing the amplitudes of the radiation received by corresponding ones of the antennae of the first and second arrays and deriving therefrom a third quantity approximately, but unambiguously, representative of the direction of incidence of the radiation projected into the plane of the arrays; and
   e. means for deriving from the first and second quantities a representation of an angle $\theta$ between the direction of incidence of the radiation projected into the plane of the arrays and a reference direction in the plane of the arrays, said angle $\theta$ being consistent with the third quantity.

5. A radio-direction finding system comprising:
   a. a plurality of adjacent , coplanar, rectilinear antenna arrays which face in different respective directions and which are adapted to receive radiation from a distant source;
   b. means for determining, for each of first and second ones of the arrays, a first phase difference between the radiation received at a widely-spaced pair of the antennae in the array and a second phase difference between the radiation received at a more-closely-spaced pair of the antennae in the array;
c. means for deriving from the first and second phase differences determined for each of the first and second arrays respective first and second quantities representative of possible values of an angle, in a plane containing the respective array and a source of the radiation, at which the radiation is incident on said array;
d. means for comparing the amplitudes of the radiation received by corresponding ones of the antennae of the first and second arrays and deriving therefrom a third quantity approximately, but unambiguously, representative of the direction of incidence of the radiation projected into the plane of the arrays; and
e. means for deriving from the first and second quantities and the radiation frequency a representation of an angle $\beta$ between the direction of incidence of the radiation and the plane of the arrays, said angle $\beta$ being consistent with the third quantity.

6. A system as in claim 4 or 5 including means for comparing the amplitudes of the radiation received by corresponding ones of the antennae of at least three of said arrays, where the first array is the array which receives the largest amplitude radiation, and where the seocnd array is one of two arrays forming the smallest angles with the first array which receives radiation of amplitude larger than or equal to the radiation received by the other of the two arrays.

7. A system as in claim 6 where the arrays are successively disposed end-to-end.

8. A system as in claim 7 comprising at least four arrays disposed in a substantially closed loop.

9. A system as in claim 4 or 5 including means for detecting whether the angle between the direction of incidence of the radiation and the plane of the arrays exceeds a predetermined value and for thereupon inhibiting further derivation of the quantities.

10. A system as in claim 9 where the predetermined value is dependent on the radiation frequency.

* * * * *